US006917841B2

(12) United States Patent
Conchieri et al.

(10) Patent No.: US 6,917,841 B2
(45) Date of Patent: Jul. 12, 2005

(54) PART NUMBER INHIBIT CONTROL

(75) Inventors: Brian P. Conchieri, Essex Junction, VT (US); Bryan L. Rose, Essex Junction, VT (US); Steven M. Ruegsegger, Jericho, VT (US); Sylvia R. Tousley, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 10/248,100

(22) Filed: Dec. 18, 2002

(65) Prior Publication Data
US 2004/0122546 A1 Jun. 24, 2004

(51) Int. Cl.[7] .............................................. G06F 19/00
(52) U.S. Cl. ..................... 700/95; 700/110; 700/115
(58) Field of Search ............................ 700/95–97, 103, 700/104, 106, 108–110, 115, 119, 28–33, 51, 116; 702/179–181; 707/3

(56) References Cited

U.S. PATENT DOCUMENTS 6,303,395 B1 * 10/2001 Nulman ....................... 438/14
6,424,876 B1 * 7/2002 Cusson et al. .............. 700/108
6,727,106 B1 * 4/2004 Ankutse et al. ................ 438/5
2003/0158710 A1 * 8/2003 Bowley et al. ............. 702/189

OTHER PUBLICATIONS

Love et al., "A Knowledge–Based Approach for Detection and Diagnosis of Out–Of–Control Events in Manufacturing Processes", 1989, IEEE.*
Love et al. "Knoweledge–Based Detection of Out–Of–Control Outputs in Process Control", 1990, IEEE.*

* cited by examiner

Primary Examiner—Leo Picard
Assistant Examiner—Chad Rapp
(74) Attorney, Agent, or Firm—Richard M. Kotulak

(57) ABSTRACT

A method and system for applying run rules on an individual part number basis in order to detect out-of-control events for a distinct sub-population within a general technology population. The invention thus provides for line tailoring by part number by acquiring measurement data of the part number from a manufacturing line for a measured parameter; retrieving a specification for the part number from a database; executing custom run rules by part number against the measured data using the specifications; and rejecting requests to process the part number if a run rule violation exists.

11 Claims, 9 Drawing Sheets

```
/****************************************************************/
/* Tool,WPN,US Fail/Number,UC F/N,UU F/N,UT F/N,LT F/N,LW F/N,LC F/N,LS F/N */
/****************************************************************/
       *, 0000050H6784,  2/ 3 |  3/ 5 |  4/ 6 |  0/ 0 |  0/ 0 |  7/ 7 |  3/ 5 |  2/ 3 |
       *, 0000057F4707,  2/ 3 |  3/ 5 |  4/ 6 |  7/ 7 |  7/ 7 |  4/ 6 |  3/ 5 |  2/ 3 |
       *, 0000057P7521,  2/ 3 |  3/ 5 |  4/ 6 |  7/ 7 |  7/ 7 |  4/ 6 |  3/ 5 |  2/ 3 |
       *, 0000046L1602,  2/ 3 |  3/ 5 |  4/ 6 |  7/ 7 |  7/ 7 |  4/ 6 |  3/ 5 |  2/ 3 |
       *, 0000075H3332,  2/ 3 |  3/ 5 |  4/ 6 |  7/ 7 |  7/ 7 |  6/ 6 |  3/ 5 |  2/ 3 |
       *, 0000006K7136,  2/ 3 |  3/ 5 |  4/ 6 |  7/ 7 |  7/ 7 |  4/ 6 |  3/ 5 |  2/ 3 |
       *, 0000001L4200,  2/ 3 |  3/ 5 |  4/ 6 |  0/ 0 |  0/ 0 |  4/ 6 |  3/ 5 |  2/ 3 |
       *, 0000057F4601,  2/ 3 |  3/ 5 |  4/ 6 |  0/ 0 |  7/ 7 |  4/ 6 |  3/ 5 |  2/ 3 |
       *, 0000050H8340,  2/ 3 |  3/ 5 |  4/ 6 |  0/ 0 |  7/ 7 |  4/ 6 |  3/ 5 |  2/ 3 |
       *, 0000088H5008,  2/ 3 |  3/ 5 |  4/ 6 |  0/ 0 |  7/ 7 |  4/ 6 |  3/ 5 |  2/ 3 |
       *, 000005737543,  2/ 3 |  3/ 5 |  5/ 6 |  0/ 0 |  0/ 0 |  5/ 6 |  3/ 5 |  2/ 3 |
       *,            *,  2/ 3 |  3/ 5 |  4/ 6 |  0/ 0 |  0/ 0 |  4/ 6 |  3/ 5 |  2/ 3 |
``` zone:   A    B    C    D    E    F    G    H

Figure 6

PART NUMBER INHIBIT CONTROL

BACKGROUND OF THE INVENTION

1. Field of the Invention

This invention relates to process control inside a manufacturing facility. Particularly it provides an alternative to statistical process control ("SPC") methods used in a multi-part number manufacturing facility. More particularly the invention addresses the issue of undetected part number sub-populations being manufactured differently than a larger technology population. Its purpose is to protect the manufacturer's WIP and to ensure product conforms to customer specifications.

2. Background of the Invention

In a multi-part number manufacturing environment, the fabricator offers a set of generic "capabilities" or "technologies" to their customers. Each technology has a set of specifications that the customer's product will achieve. Typically, the newest or latest generation technology has tighter specs or more features resulting in a more advanced product and also a higher price to manufacture. The customer then requests their design be fabricated in a particular technology—one that meets their own criteria within a cost requirement. In this environment, the fabricator will then have individual part numbers for each customer's design, all within some defined technology.

This is the current situation for many semiconductor manufacturers. With the increase in fabless design shops, many more manufacturers are turning into a multi-part number fab.

In a multi-part number fab, the current standard is for SPC control to be done on a technology basis. Since all the individual part numbers within a technology are manufactured with the same processes, they define a single population. Therefore, each control chart contains all the collective part numbers within a single technology. SPC run rules are evaluated against that technology to determine if that technology is out-of-control (OOC). If an OOC event is detected, then that technology is inhibited and cannot continue being manufactured until the inhibit is resolved.

However, this model of industry-standard SPC control has three major impediments for the multi-part number fab: 1) the customer's product is at risk of being OOC and undetected by SPC within the larger technology population, 2) true SPC limits are defined by the capability of the manufacturing process and not the customer requirements and 3) the manufacturer can inhibit the entire technology for an OOC event that may be limited to one part number.

BRIEF SUMMARY OF THE INVENTION

A goal of this invention is to protect the assets of each individual customer in multi-part number manufacturing line by providing that each part number is manufactured such that critical parameters are centered on the target with an acceptable variance to meet performance goals for that part number. This cannot be accomplished using typical technology-based SPC control, which puts all part numbers within a technology together on to a SPC chart, and where the control limits are defined based on the manufacturing variance.

The present invention discloses the use of custom run rules to protect individual customer's work-in-progress in a high volume, multi-part number manufacturing facility. It addresses the issue of undetected part number sub-populations being manufactured differently than the larger technology population. Its purpose is to protect the manufacturer's WIP and to ensure product conforms to customer specifications. The invention provides the method for applying customizable run rules on an individual part number basis in order to detect out-of-control events for a distinct, yet non-obvious, subpopulation within the obvious technology population typically used for SPC.

The present invention addresses the problematic issues of using technology-based SPC control. Its purpose is to protect customer work-in-progress (WIP) by ensuring each part number has a distribution centered on the target with variance consistent with the part number performance specifications. This is accomplished via run rule evaluation on a per-part number basis. This invention alerts the manufacturer when an individual part number violates a customizable set of run rules. It also allows the manufacturer to inhibit only one part number from further processing while allowing all other part numbers in the technology to continue.

More specifically this invention provides a method and media for controlling process tools by part number in a multi-part number manufacturing technology by acquiring data by part number from a manufacturing line for a measured parameter; retrieving a specification for the part number from a database; and executing run rules against the measured data using the specifications.

BRIEF DESCRIPTION OF THE SEVERAL VIEWS OF THE DRAWINGS

FIG. 6 illustrates in tabular form the preferred embodiment used to store this set of rules.

DETAILED DESCRIPTION OF THE INVENTION

Figure 1:
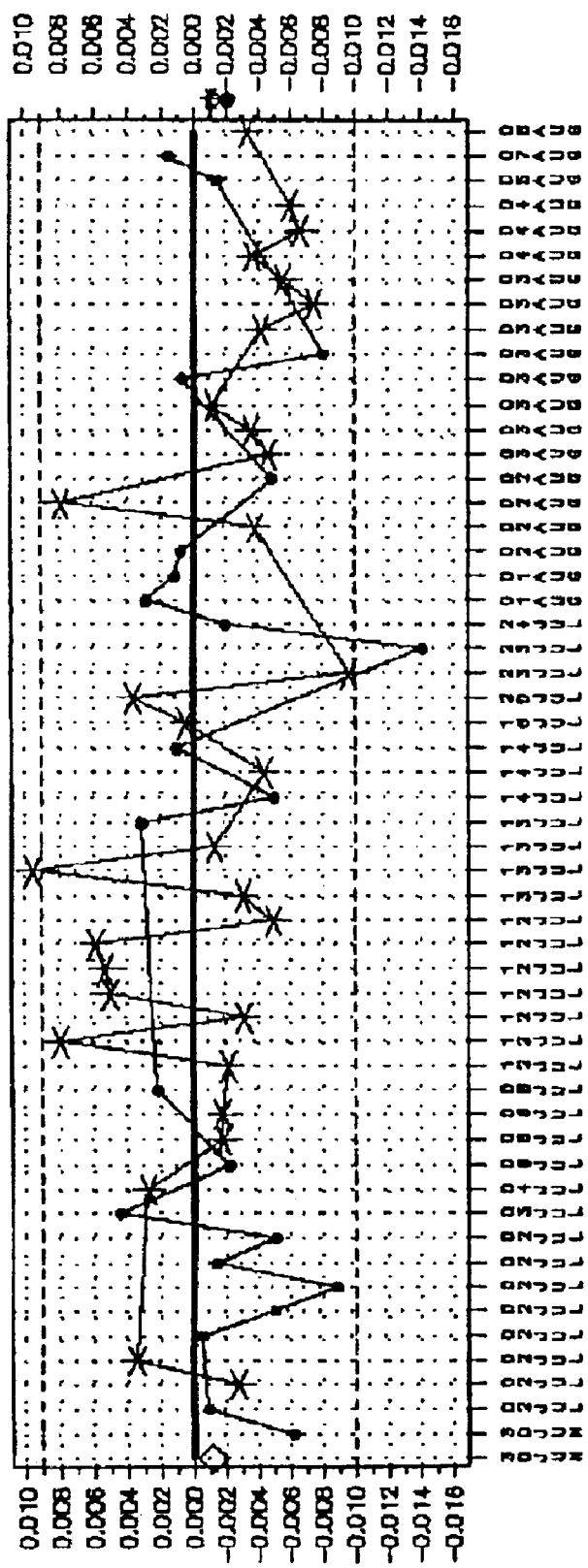
FIG. 1 illustrates an SPC chart where the measurements are centered and within specification and no SPC run rules violated.
Figure 2:
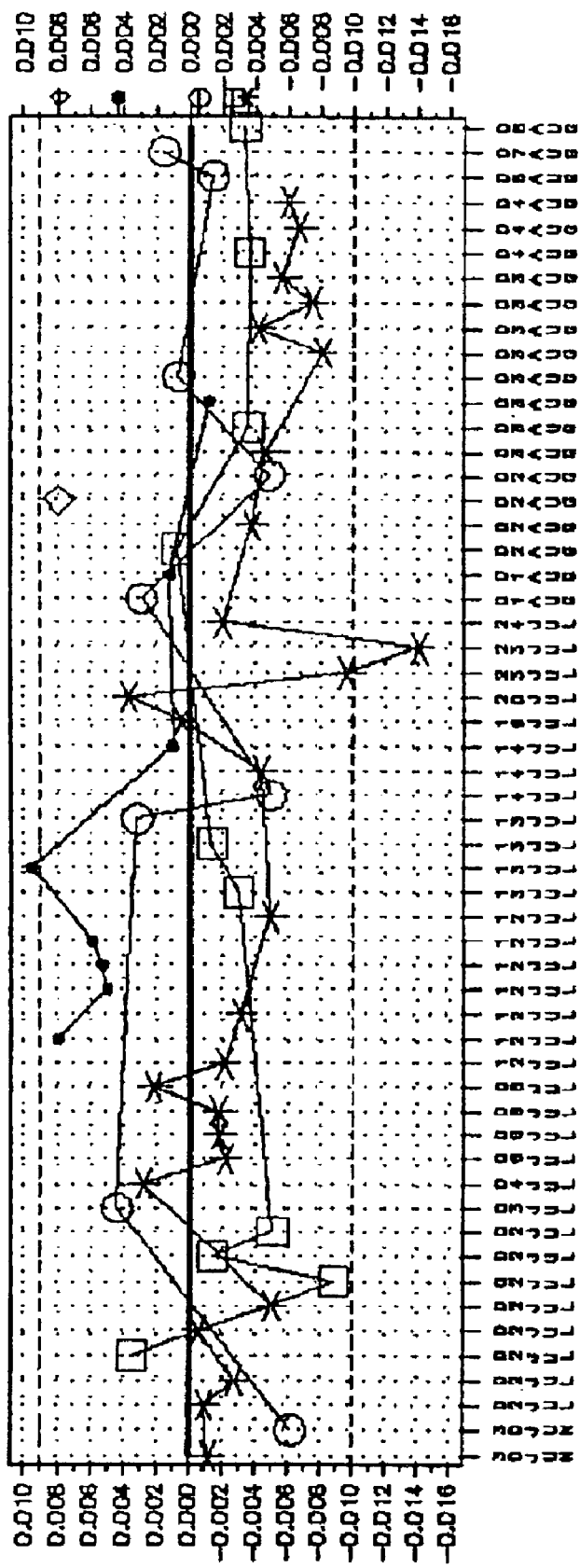
FIG. 2 illustrates an SPC chart where the measurements for part numbers showing that two of the parts are operating consistently above and below target.

Typically, it is always more desirable to put the largest single population onto an SPC chart. This strengthens a signal and increases likelihood of detecting a problem. Since all part numbers from a technology are manufactured with the same processes, they are assumed to form one population and are therefore placed together on the SPC chart. FIG. 1 illustrates an SPC chart where the measurements are centered and within specification and no SPC run rules violated. However, FIG. 2 demonstrates the shortfall of this methodology. It is actually the case that two part numbers represented by "stars" and "dots" are not centered well. One population is consistently high to target and the second is consistently low to target, yet both within the calculated process capability of the technology. When these part numbers are manufactured simultaneously, their random intermixing masks the true bi-modality of this data. The customer is expecting the distribution of its product around the technology mean. Having a distribution centered high or centered low to the technology mean could mean serviceability issues for speed binning, for example. In order to detect this situation using the technology-based SPC chart, a single part number would have to be manufactured solely by itself for a long enough period of time to violate the run rules. In a high-volume, multi-part number fabricator, that situation is improbable.

SPC defines its control limits by the variance in the process. The process may or may not be capable, having a Cp above or below 1. SPC defines its limits by the past performance of the process during a stable state. Regardless of whether or not the process is capable, the purpose of SPC control is to determine if the process has had a significant shift from its historical mean or variance.

Even though all part numbers within a technology are manufactured with the same processes, they don't always have the same desired performance requirements. This can be called "line-tailoring" where individual part numbers are centered more aggressively than the technology default. For example, microprocessors and ASICs may be manufactured in the same technology, yet the microprocessor will require a unique set of targets and tolerances to increase its value in the marketplace. In a high-volume, multi-part number fab, there are many part numbers that would benefit from line-tailoring.

Since SPC limits are defined by the manufacturing variance and some part numbers have tighter performance requirements than others, controlling only to manufacturing variance limits can result in large portions of critical part numbers missing performance windows. It is very possible for a part number to be in SPC control for the technology, yet outside its performance limits.

There are times when a certain part number will dominate a particular manufacturing point for a sequence of time. If that part number is OOC, then the technology-based SPC chart will inhibit that entire technology. Now none of the part numbers can be manufactured until the responsible engineers discover that the centering of one part number is the issue. The productivity of the entire technology is thus potentially gated by each individual part number.

Figure 3:
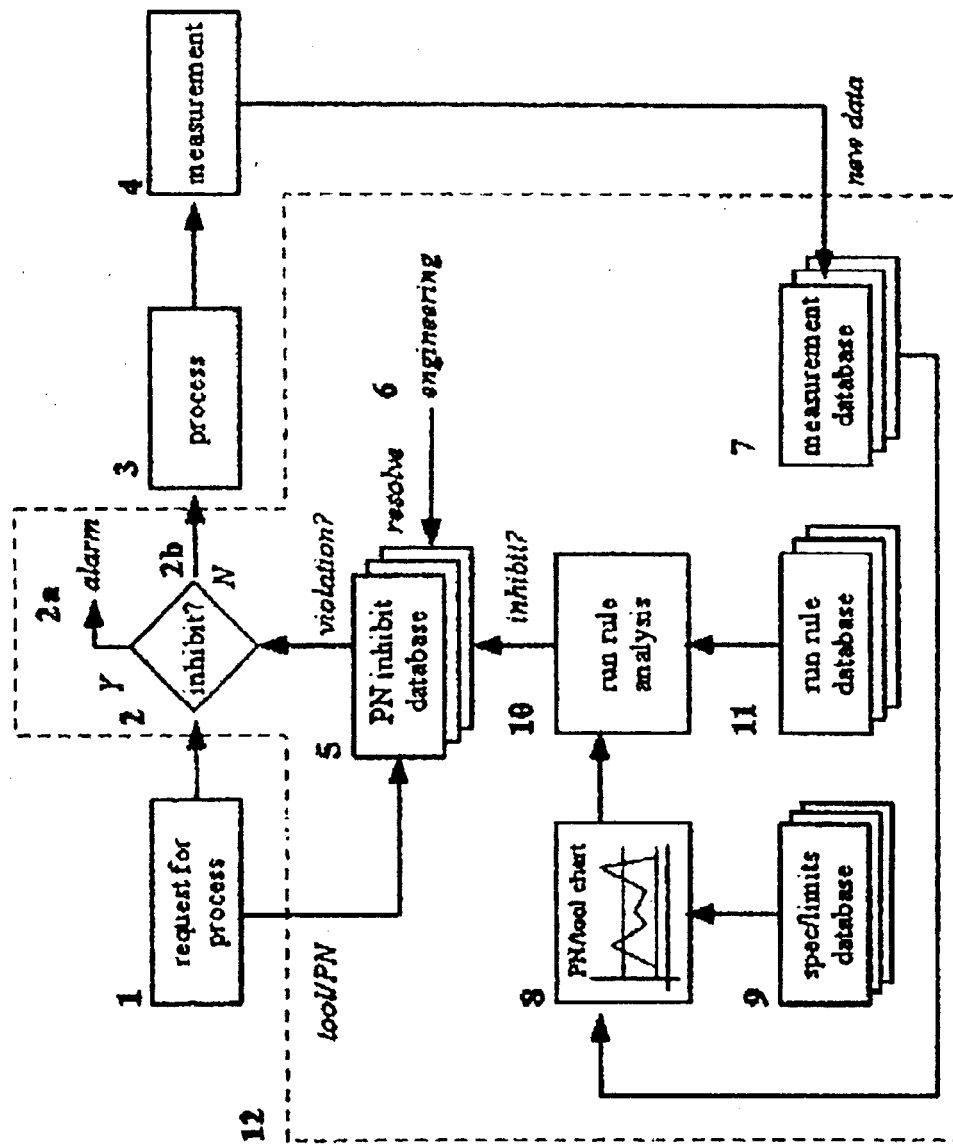
FIG. 3 illustrate a flow chart for the preferred embodiment of this invention.

FIG. 3 illustrate a flow chart for the preferred embodiment of this invention. The invention utilizes a typical manufacturing sequence of process request 1, process execution 3, and then QC measurement 4. What is different from the typical manufacturing sequence is comprised of block 12 and the interjection of step 2 before the actual processing. After a lot is selected and requested to be processed at 1, the part number inhibit database 5 is first queried at 2. If there is an inhibit for that part number and process/tool, then the request for process is rejected at 2a. If there is no inhibit (2b), then the lot is processed at 3 and one or more critical features are measured at 4. Those measurements are recorded in a by part number/process/tool database 7. This new data will initiate an update of the PN inhibit chart 8, which link measurements to process. For example, a PN inhibit chart may link gate etch with a post-gate etch critical measurement. The new measurement point and several past measurements from the database 7 will be sent to the PN inhibit chart 8 where specifications 9 will be added and sent to the analysis engine 10. This will get the run rules specified for this PN (11). If there is an inhibit, and the most recent data point is involved in the inhibit, the PN inhibit database 5 will be updated with the new inhibit and that part number will no longer be allowed to run on that tool or toolset. The inhibits are resolved by engineering personnel 6.

Figure 4:
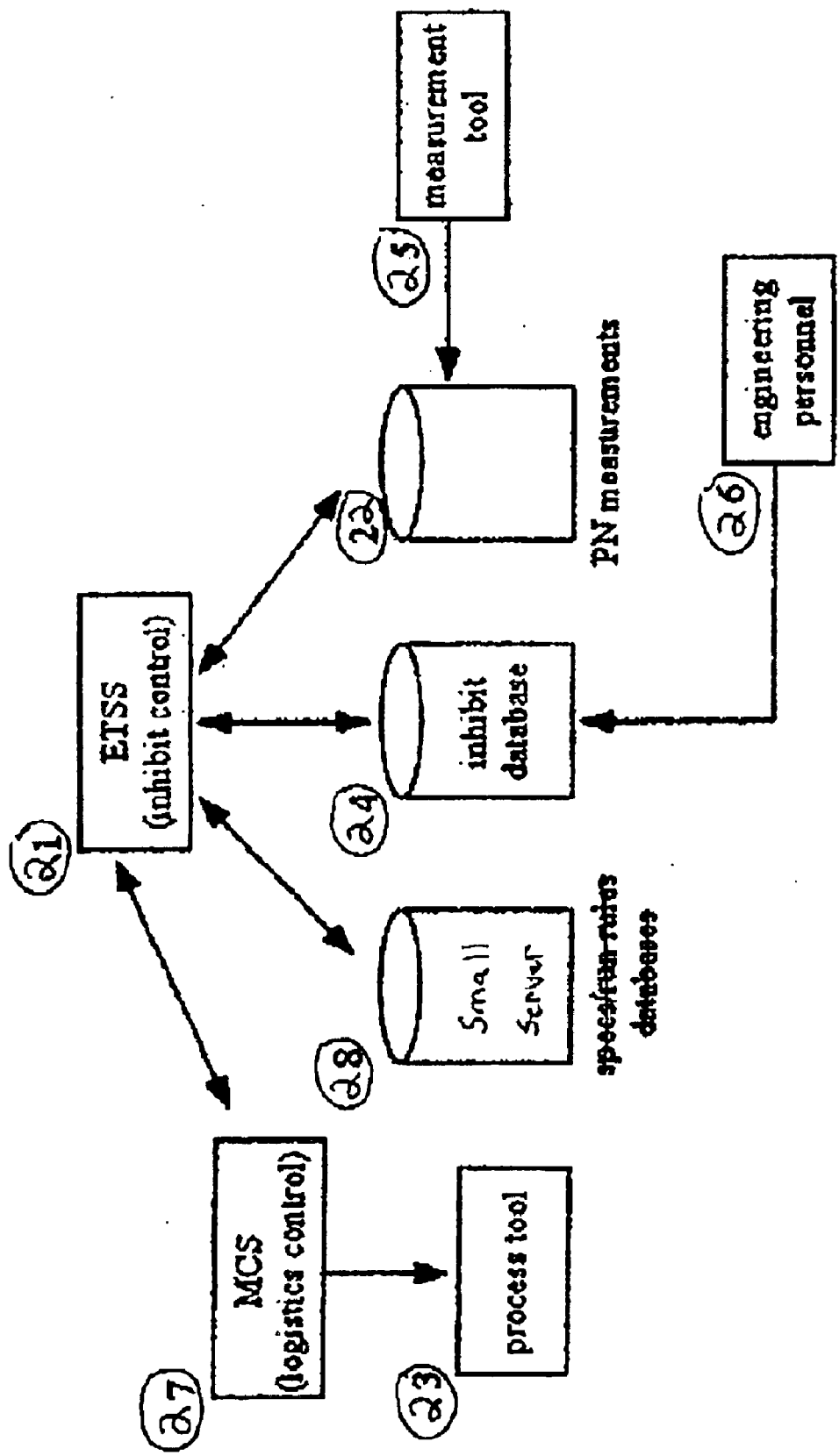
FIG. 4 is a schematic illustration of the computers, databases, and communications are required to enable this system.

A series of computers, databases, and communications are required to enable this system. FIG. 4 is a schematic illustration of the preferred embodiment. The ETSS (Enhanced Tool Support System) server 21 is used to accept/deny requests for processing from the MCS (Manufacturing Control System) server 27 which controls logistics and determines what process a lot needs next and what tools are available. Both servers containing media and programs sufficient for implementing this invention. The ETSS server queries an inhibit database 24 to see if there is an inhibit on the requested part number and process/tool. If the request is allowed, the MCS server 27 will allow the process tool 23 to process the lot, otherwise the request is rejected. Engineering personnel 26 can access this inhibit database 24 to resolve inhibits. The measurement tools 25 populate the measurement database 22. ETSS 21 uses these measurements and run rules and specs from other smaller databases on a smaller server 28 in order to check for violations. If found, an inhibit is set in the inhibit database 24.

Figure 5:
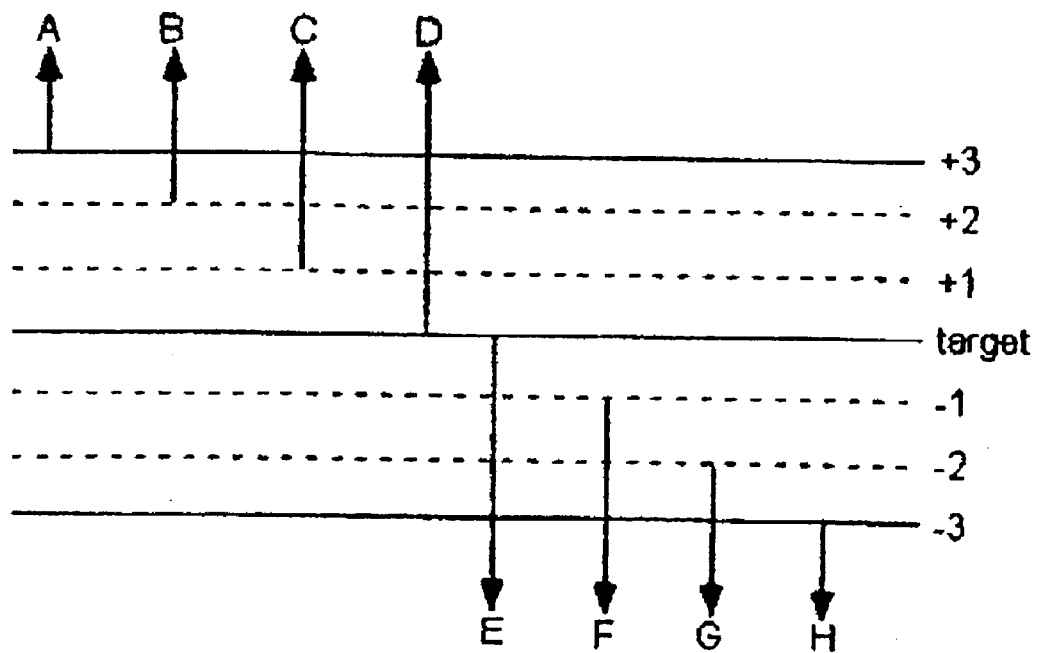
FIG. 5 illustrates in a diagram form how the run rules define an inhibit.

Since each part number has unique performance requirements, custom run-rules for each part number are available. FIG. 5 illustrates in a diagram form how the run rules define an inhibit. The total tolerance is divided by 6 equally spaced spec limits, centered on the target. There are 8 zones defined using these 6 spec limits and the target. They are labeled A–H in FIG. 5. Each zone represents the area from its respective spec limit and forward, moving away from the target. For example, a measurement will be in zone G if it is anywhere below the −2 spec limit.

Each zone has its own run rule. The run rule defines how many lots are allowed in that zone before a violation is defined. FIG. 6 illustrates in tabular form the preferred embodiment used to store this set of rules. For each part number, there are a set of number pairs. Each pair represents the rule for subsequent zones A–H. The x/y pair defines the violation rule, "x points out of y sequentially in this zone." For example, one part number may have the rules "2 out of 3 outside of zone A, or 3 out of 5 in zone B, or 4 out of 6 in zone C, or 7 out of 7 in zone D." Run rules are typically symmetric about the target, but not necessarily. This embodiment has defined 6 spec limits and 8 zones, however the invention is not limited to this particular realization and certainly other approaches can be used to implement the run rules for the purposes of this.

These run rules are akin to the seven Westinghouse SPC run rules. Those rules are based on statistical probabilities of that event happening in a process with a consistent, normally distributed output. The run rules for this invention are defined by engineering input based upon customer requirements for that part. For example, if we have a large volume part number with a wide process window, we may not have a part number inhibit rule for zones D and E (the ones closest to the target). However, if there exists a critical part number with just a few units being created, said run rules would be included. The run rule may be defined as "5 out of 5" or "7 out of 7". Engineering judgment will be used on a case-by-case basis such that it would be tailored to the customer's requirements.

Figure 7:
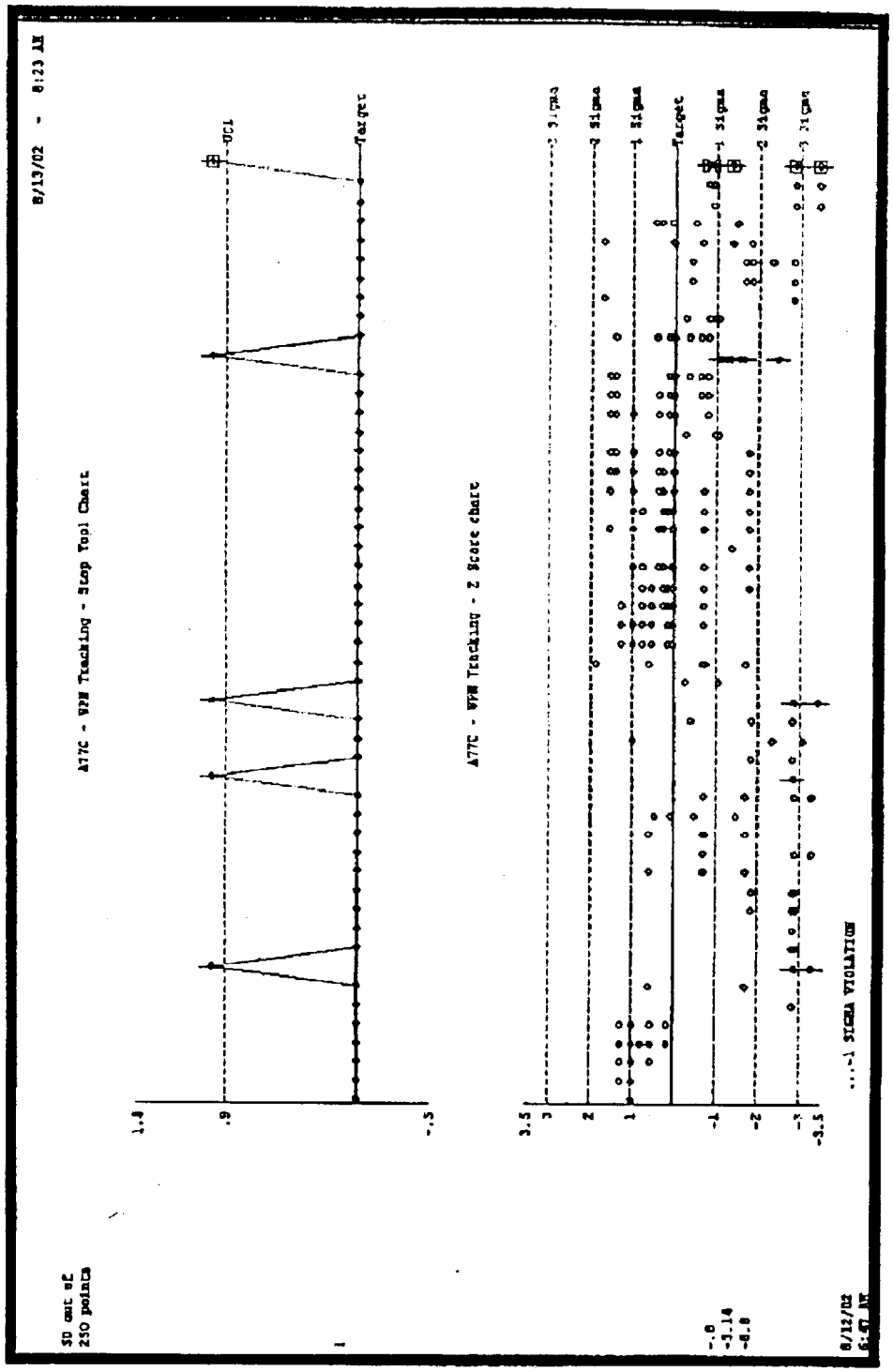
FIG. 7 illustrates in a diagram form when a part number is inhibited and its corresponding normalized data-points.

Rather than view the measurements for each part number separately on its own chart, the preferred embodiment designed a single view part number inhibit chart, as shown in FIG. 7. Each column represents a new measurement for a single part number. Since the run-rules involve up to seven points, the last six measurements from that part number are added to the new one and the run-rules for that part number are executed against them. If there is a violation, then that part number is inhibited. The top chart in FIG. 7 illustrates in diagram form when a part number is inhibited when the value goes to 1, otherwise it is zero. The bottom chart in FIG. 7 illustrates the columns of data where each column is one part number and each data point is normalized to the tolerance limits for that part number.

Figure 8:
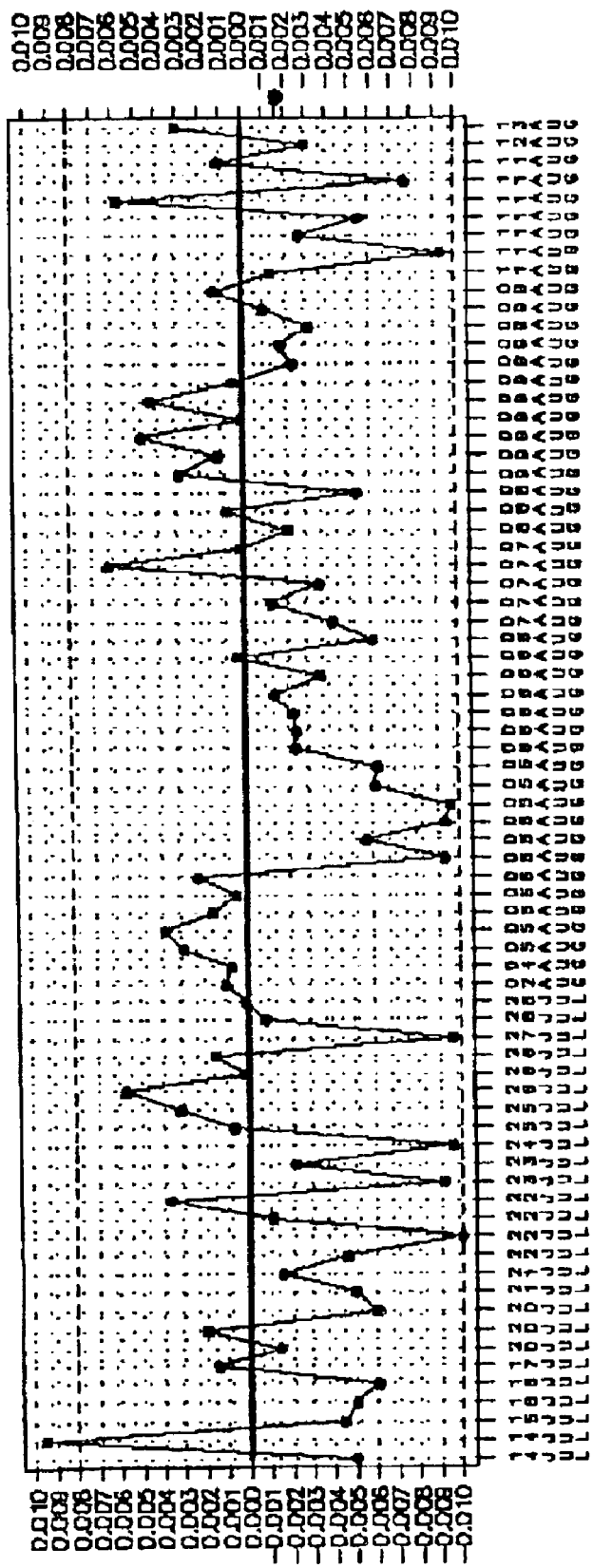
FIG. 8 illustrates in chart form a plot where part numbers are not delineated.
Figure 9:
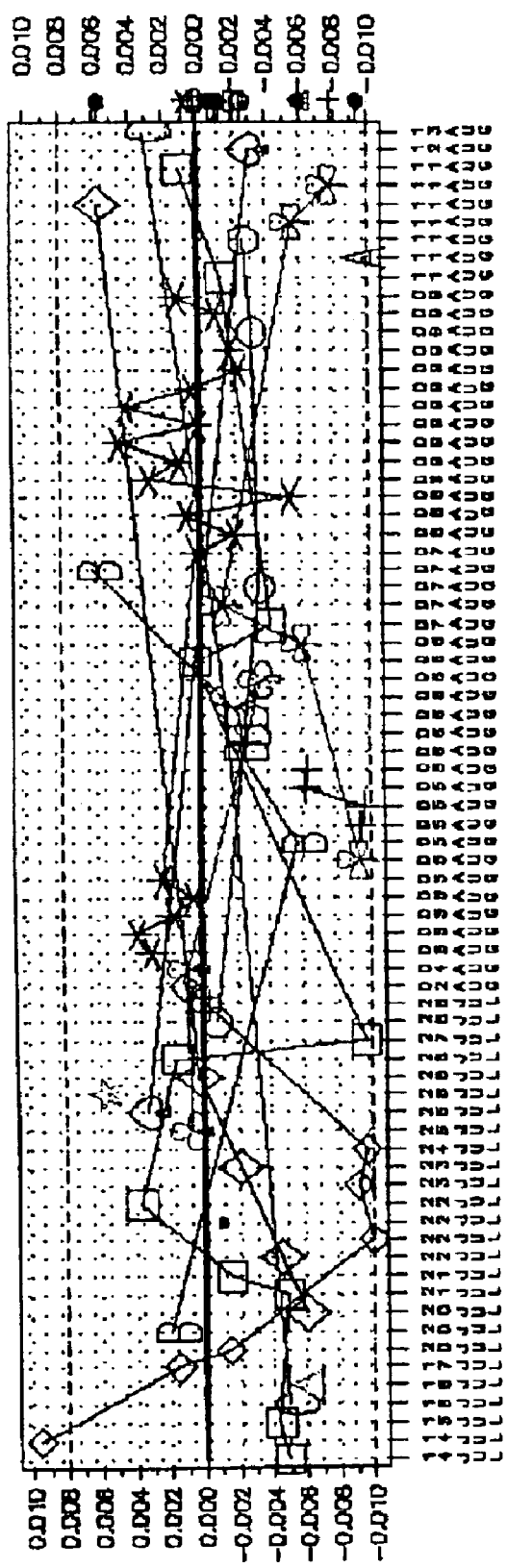
FIG. 9 illustrates in chart form a plot where part numbers are delineated.

The last column in FIG. 7 shows a part number with an inhibit. The comment at the bottom of the chart shows that this particular product has a "â€1-sigma violation". This could cause a performance issue for the customer who expects some product above and some below. FIG. 8 demonstrates how this violation is undetected where all lots for a technology are plotted and no violation is discovered. However, FIG. 9 is the same data as FIG. 8, yet delineated by part number. The part number of interest has the clover symbol. It shows that all lots were below target. However, when mixed with the other part numbers, its off-centered nature is masked by the product mix when taken as a whole.

Note, this invention does not supplant typical SPC; rather, it enhances it. This invention is used in conjunction with SPC to further enable a fabricator to meet customer requests. SPC enables the manufacturer to keep producing product within their manufacturing capabilities. This part number inhibit invention enables the manufacturer to keep producing product that meets the customer's requirements.

Also note that what is inhibited can vary. You can simply inhibit a specific tool, a subset of tools, all tools, a process, or all processes on a part number basis.

It is thus believed that the operation and construction of the present invention will be apparent from the foregoing description. The description of the embodiments of the present invention is given above for the understanding of the present invention. It will be understood that the invention is not to the particular embodiments described herein, but is capable of various modifications, rearrangements and substitutions will now become apparent to those skilled in the art without departing from the scope of the invention. Therefore it is intended that the following claims cover all such modifications and changes as fall within the true spirit and scope of the invention.

What is claimed is:

1. A method for line tailoring by part number in a multipart number manufacturing technology, comprising the steps of:

acquiring measurement data by part number from a manufacturing line for a measured parameter;

retrieving a specification for the part number from a database;

executing custom run rules by part number against the measured data using the specifications; and rejecting requests to process the part number if a run rule violation exists.

2. The method of claim 1 wherein that in addition to a condition for rejection that a run rule violation exists, there is also a condition that the violation has not been resolved.

3. The method of claim 1 wherein the custom run rules are created from customer performance data.

4. A system network which determines out-of-control conditions by part number in a multi-part number manufacturing environment, which system network comprises:

a manufacturing control system that determines what process a part number needs and what tool;

a tool support system which accepts or denies requests for processing from the manufacturing control system, and comprises a program which processes measurements, run rules and specifications for part numbers and determines whether an inhibit should be issued;

a inhibit database containing information on whether there is an inhibit on the requested part number and a process and/or tool and which can be queried by the tool support system; and a measurement tool which feeds a measurement database with measurements and which can be queried by the tool support system.

5. The network system of claim 4 wherein the manufacturing control system and the tool support system, and measurement tools are on a series of distributed computer systems.

6. A program storage device readable by machine, tangibly embodying a program of instructions executable by the machine to perform method steps for line tailoring by part number in a multipart number manufacturing technology, the method comprising the steps of:

acquiring measurement data by part number from a manufacturing line for a measured parameter;

retrieving a specification for the part number from a database;

executing custom run rules by part number against the measured data using the specifications; and rejecting requests to process the part number if a run rule violation exists.

7. The method of claim 6 wherein that in addition to a condition for rejection that a run rule violation exists, there is also a condition that the violation has not been resolved.

8. The method of claim 6 wherein the custom run rules are created from customer performance data.

9. The method of claim 6 also comprising the step of, resolving an inhibiting of the processing of the part number by taking appropriate action regarding the measured parameter.

10. The method of claim 6 also comprising the step of, inhibiting a process running the part number as a consequence of the request being rejected.

11. The method of claim 6 also comprising the step of, inhibiting a tool running the part number as a consequence of the request being rejected.

* * * * *